United States Patent Office 2,872,455
Patented Feb. 3, 1959

2,872,455

PROCESS FOR THE PREPARATION OF DITHIA-CYCLOPENTYLALIPHATIC ACIDS

Milon W. Bullock, Pearl River, N. Y., assignor to American Cyanamid Company, New York, N. Y., a corporation of Maine No Drawing. Application April 24, 1952
Serial No. 284,205

3 Claims. (Cl. 260—327)

This invention relates to new and useful compounds and to processes of preparing the same.

I have discovered that by a series of reactions in which certain new intermediates are employed, it is possible to prepare a new group of organic compounds having useful properties as, for example, oxidation inhibitors and growth supporting factors for certain microorganisms including S. facelis, Tetrahymena geleii, and some Corynebacterium species.

The new compounds which are made as a result of the reactions about to be described may be represented by the general formula $$ROOC(CH_2)_n-CH-CH_2$$
$$\phantom{ROOC(CH_2)_n-C}|\phantom{H-}|$$
$$\phantom{ROOC(CH_2)_n-C}S\phantom{H-}CH_2$$
$$\phantom{ROOC(CH_2)_n-CH}\diagdown\diagup$$
$$\phantom{ROOC(CH_2)_n-CHS}S$$

in which R is hydrogen, a cationic radical or an ester forming group, and $n$ is a small whole number. These compounds may be designated as omega [3-(1,2-dithiolanyl)] aliphatic acids, salts and esters thereof.

Inasmuch as the synthesis of these new compounds requires several steps using what appears to be hitherto undescribed new compounds, which processes and compounds are also included within the scope of the present invention, an outline of the synthesis in general terms will first be given after which it will be illustrated by a specific example.

The synthesis employs as starting material ester-acid halides of the type $RO-CO-(CH_2)_nCOX$ where R is alkyl, $n$ is a whole number and X is a halogen, preferably chlorine. These ester-acid halides are reacted with ethylene gas in the presence of a proper catalyst, preferably anhydrous aluminum chloride, to yield products of the type $$RO\overset{O}{\overset{\|}{C}}(CH_2)_n-\overset{O}{\overset{\|}{C}}-CH_2-CH_2X$$

wherein the values of $n$ and X are the same as before. The reaction can be carried out by bubbling the ethylene through a solution of anhydrous aluminum chloride in the acid chloride at room temperature of slightly higher temperatures. The reaction can also be carried out by adding the acid chloride to a solution or suspension of the catalyst in an appropriate solvent such as carbon disulfide or ethyl bromide through which a stream of ethylene is being passed. The product is isolated by pouring the reaction mixture into crushed ice and water and extracting the product with suitable solvents such as chloroform and ether. Although not absolutely necessary, the unreacted ester-acid chloride can be recovered as the half-acid ester by extraction of the organic layer with sodium bicarbonate solution or other immiscible alkaline solutions. The product is obtained by evaporation of the solvent. The β-halogen substituted ketones are then distilled at reduced pressures to yield, by dehydrohalogenation, unsaturated ketones of the type $$RO\overset{O}{\overset{\|}{C}}-(CH_2)_n\overset{O}{\overset{\|}{C}}CH=CH_2$$

where the values of R and $n$ are the same as before.

The unsaturated ketones are reacted with thioacetic acid to yield compounds of the type $$RO\overset{O}{\overset{\|}{C}}-(CH_2)_n-\overset{O}{\overset{\|}{C}}-CH_2-CH_2-S\overset{O}{\overset{\|}{C}}-CH_3$$

where the values of R and $n$ are the same as before.

The omega-acetylketoesters are reduced with sodium borohydride or other suitable reducing agents such as lithium aluminum hydride in methanol, ethanol, or other suitable solvents to yield after hydrolysis omega-thiolhydroxyacids of the type $$HO\overset{O}{\overset{\|}{C}}-(CH_2)_n-\underset{\underset{OH}{|}}{CH}-\underset{\underset{SH}{|}}{CH_2}-CH_2$$

where the value of $n$ is the same as before.

These thiolhydroxyacids are converted to dithiol acids by refluxing with excess thiourea and a halogen acid such as 48% hydrobromic or 50% hydroiodic acid. The length of the reflux period is not critical but an eight hour reaction time gives satisfactory results. The intermediate thiuronium salts need not be isolated, but may be hydrolyzed in the reaction mixture to the dithiol with bases such as sodium hydroxide or sodium carbonate. Acidification of the alkaline solution liberates the dithiol acid which is recovered by extraction with chloroform or some other suitable solvent.

The product from this reaction, a dithiol acid of the type $$HO\overset{O}{\overset{\|}{C}}(CH_2)_n\underset{\underset{SH}{|}}{CH}CH_2\underset{\underset{SH}{|}}{CH_2}$$

where the value of $n$ is the same as above, can be obtained by evaporation of the solvent or can be oxidized to the more distillable intramolecular disulfide by agitating the chloroform solution with an aqueous solution of iodine in potassium iodide to yield compounds of the type $$HOOC(CH_2)_n\underset{\underset{S\text{------}S}{|}}{CH}CH_2CH_2$$

where the value of $n$ is the same as before.

These intramolecular disulfides can be purified by vacuum distillation, chromatography or recrystallization from suitable solvents such as cyclohexane or a mixture of ligroin and chloroform.

Example

Ethylene gas was passed into a stirred solution of 35.4 grams (0.273 mole) of anhydrous aluminum chloride in 26.3 g. (0.136 mole) of ethyl adipylchloride. The solution became slightly warm and some HCl was evolved. After six hours the mass solidified. The contents of the reaction flask were stirred into a mixture of ice and water and the product extracted with chloroform. The chloroform solution was washed with half saturated sodium bicarbonate solution and dried over sodium sulfate. The solvent was distilled and the residue purified by vacuum distillation. All the product distilled 116–118° at 1.5 mm. The yield 8.0 g. (0.043 mole), 32% of the desired ethyl Δ⁷,6-ketooctenoate.

Alternatively, this product can be prepared by the reaction of ethylene with ethyl adipylchloride with ethyl bromide as the solvent as follows.

In a 300 ml. 3-necked flask equipped with stirrer, condenser, gas inlet tube and dropping funnel, were placed 69.5 g. (0.52 mole) of anhydrous aluminum chloride and 100 ml. of ethyl bromide. The solution was stirred rapidly and a stream of ethylene bubbled through the solution while 50 g. (0.26 mole) of ethyl adipylchloride was added dropwise over a period of one hour. The ethylene gas was bubbled through the cold solution for two hours, and the mixture passed slowly into a stirred solution of ice and water. The organic layer was separated, washed with sodium bicarbonate solution and dried over sodium sulfate. The solvent was evaporated and the residue purified by vacuum distillation. The product distilled 112–114° at 0.2 mm. The yield was 12 g. (0.065 mole) or 17%.

To 8.0 g. (0.0435 mole) of ethyl Δ⁷, 6-ketooctenoate contained in a 50 ml. flask equipped with a condenser was added 3.62 g. (0.048 mole) of thioacetic acid. The reaction was rapid and exothermic. The excess thioacetic acid was distilled off under the reduced pressure of an aspirator. The product was taken up in methanol and 4 g. (large excess) of sodium borohydride was added in small portions. The reaction was left standing overnight. The solution was made strongly alkaline by the addition of 10 g. of KOH in 15 ml. of water and refluxed three hours. The methanol was distilled off and replaced by water. The aqueous solution was acidified and the product extracted with two 25 ml. portions of chloroform. The combined chloroform extracts were dried over sodium sulfate and distilled leaving 8.0 g. (0.0416 mole) of an almost colorless oil. Approximately 1 ml. of this oil was subjected to vacuum distillation. The product distilled 164° C. at 0.05 mm. and had equivalent weight 211 suggesting that the 8-thiol-6-hydroxyoctanoic acid partially lactonized on distillation.

A solution of 5.8 g. (0.032 mole) of 8-thiol-6-hydroxyoctanoic acid, prepared as described above, 5 g. (0.066 mole) thiourea, and 25 ml. of 50% HI was refluxed eight hours. The solution was made alkaline with 40% KOH and refluxed 30 minutes. The alkaline solution was extracted with chloroform which was discarded. The aqueous solution was acidified with concentrated HCL and extracted with two 25 ml. portions of chloroform. The combined chloroform extracts were dried over sodium sulfate and distilled leaving 4.3 g. of pale yellow oil having equivalent weight 196.

Approximately 3 g. of the 6,8-dithioloctanoic acid was dissolved in 30 ml. of chloroform and oxidized by adding KI—I₂ solution to the agitated chloroform solution until the color of the iodine no longer disappeared. The chloroform layer was separated, dried and distilled leaving a yellow oil. This material was purified by vacuum distillation. The material distilled 130–155° at 0.1 mm. This material and an identical product from another run was purified by chromatography on silicic acid with chloroform and methanol to yield a crystalline product which was purified by recrystallization from a chloroform ligroin mixture of yield omega [3-(1,2-dithiolanyl)]-valeric acid, M. P. 57.6–58.5°. The neutralization equivalent, and the carbon, hydrogen and sulphur analyses agreed closely with the theoretical.

The oxidation of the dithiol can be accomplished by the use of air in the presence of ferric iron and with other oxidizing agents.

When it is desired to obtain compounds in which $n$ in the general formula is 2, the starting material would be ethylsuccinylchloride or some other ester acid halide of desired type. When $n$ in the general formula is desired to be 3, the starting material would be ethylglutaryl chloride or other esters of glutaryl halides.

Salts of the acids are readily prepared by simple neutralization with alkali, ammonia or amine wherever desired. Esters are readily prepared by heating the acid with an alcohol in the presence of an esterifying catalyst or, for example, by reacting the acid with diazomethane or diphenyldiazomethane to give the methyl and benzylhydryl ester respectively.

The 1,2-dithiolanyl ring may be readily oxidized. Treatment of the products with tertiary butyl hydroperoxide will result in the addition of one atom of oxygen to the disulfide ring whereas treatment with hydrogen peroxide will yield products in which two atoms of oxygen are attached to the ring on either or both of the sulphur atoms. These products likewise possess useful growth supporting properties and are intended to be included within the scope of the invention.

I claim:
1. A process of preparing compounds having the general formula:

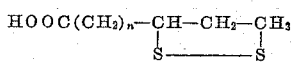

in which $n$ is a small whole number which comprises reacting a compound having the formula:

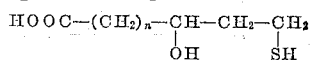

with excess thiourea and a hydrohalogen acid in which the atomic number of the halogen is greater than 16 to obtain the corresponding dithiol, mixing the said dithiol with an oxidizing agent of the group consisting of iodine and oxygen and recovering said compounds therefrom.

2. A process of preparing compounds having the general formula:

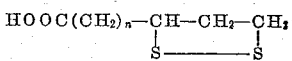

in which $n$ is a small whole number which comprises reacting a compound having the formula:

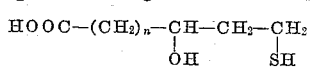

with excess thiourea and hydriodic acid to obtain the corresponding dithiol, mixing the said dithiol with iodine in an inert organic solvent and recovering said compounds therefrom.

3. A process of preparing omega [3-(1,2-dithiolanyl)] valeric acid which comprises reacting 8-thiol-6-hydroxyoctanoic acid with excess thiourea and hydriodic acid to obtain 6,8-dithioloctanoic acid, mixing the latter acid with iodine in the presence of an inert organic solvent and recovering said compound therefrom.

References Cited in the file of this patent

UNITED STATES PATENTS

| 2,292,456 | Lincoln et al. | Aug. 11, 1942 |
| 2,493,071 | Kendall et al. | Jan. 3, 1950 |

OTHER REFERENCES

Reed et al.: J. Biol Chem., vol. 192, pages 859–865 (1951).
Reed et al.: J. A. C. S., vol. 75, pages 1271–73 (1953).
Walton et al.: J. A. C. S., vol. 76, page 4748 (1954).
Nutrition Reviews, 11:59–61 (1953).
Autenrieth et al.: Berichte 32:1370–71 (1899).
Stokstad et al.: Archives Biochemistry 20:75–82 (1949).
Reed et al.: Science 114: 93 and 94 (1951).
Brockman and Bullock: JACS 74: 1868 and 1869 (1952).
Chivers et al.: J. Chem. Soc., 1928, pages 697–702.